(12) United States Patent
Morishita et al.

(10) Patent No.: US 12,043,075 B2
(45) Date of Patent: Jul. 23, 2024

(54) VEHICLE HEIGHT ADJUSTMENT DEVICE

(71) Applicant: HONDA MOTOR CO., LTD., Tokyo (JP)

(72) Inventors: Fumihiro Morishita, Tokyo (JP); Kuniyoshi Tanaka, Tokyo (JP); Masaya Kusatani, Tokyo (JP); Daijiro Endo, Tokyo (JP); Takumi Ozawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 17/811,886

(22) Filed: Jul. 12, 2022

(65) Prior Publication Data

US 2023/0023248 A1    Jan. 26, 2023

(30) Foreign Application Priority Data

Jul. 20, 2021 (CN) .......................... 202110817537.7

(51) Int. Cl.
*B60G 17/017* (2006.01)

(52) U.S. Cl.
CPC ........ *B60G 17/017* (2013.01); *B60G 2500/30* (2013.01); *B60G 2600/20* (2013.01)

(58) Field of Classification Search
CPC .............. B60G 17/017; B60G 2500/30; B60G 2600/07; B60G 2600/20
See application file for complete search history.

(56) References Cited

FOREIGN PATENT DOCUMENTS

| GB | 2346592 A | * | 8/2000 | ........... B60G 17/016 |
| JP | 2008126812 A | | 6/2008 | |

OTHER PUBLICATIONS

Takamura, JP 2008-126812, machine translation. (Year: 2008).*

* cited by examiner

*Primary Examiner* — Hung Q Nguyen
*Assistant Examiner* — Mark L. Greene
(74) *Attorney, Agent, or Firm* — CKC & Partners Co., LLC

(57) ABSTRACT

The vehicle height adjustment device includes: a vehicle height adjuster which adjusts vehicle height; a prohibiting mode setter which sets a prohibiting mode that prohibits vehicle height adjustment by the vehicle height adjuster; a first prohibition release unit which performs release of the prohibiting mode in the prohibiting mode setter; and a second prohibition release unit which enables vehicle height adjustment by the vehicle height adjuster, while the prohibiting mode is set by the prohibiting mode setter.

3 Claims, 2 Drawing Sheets

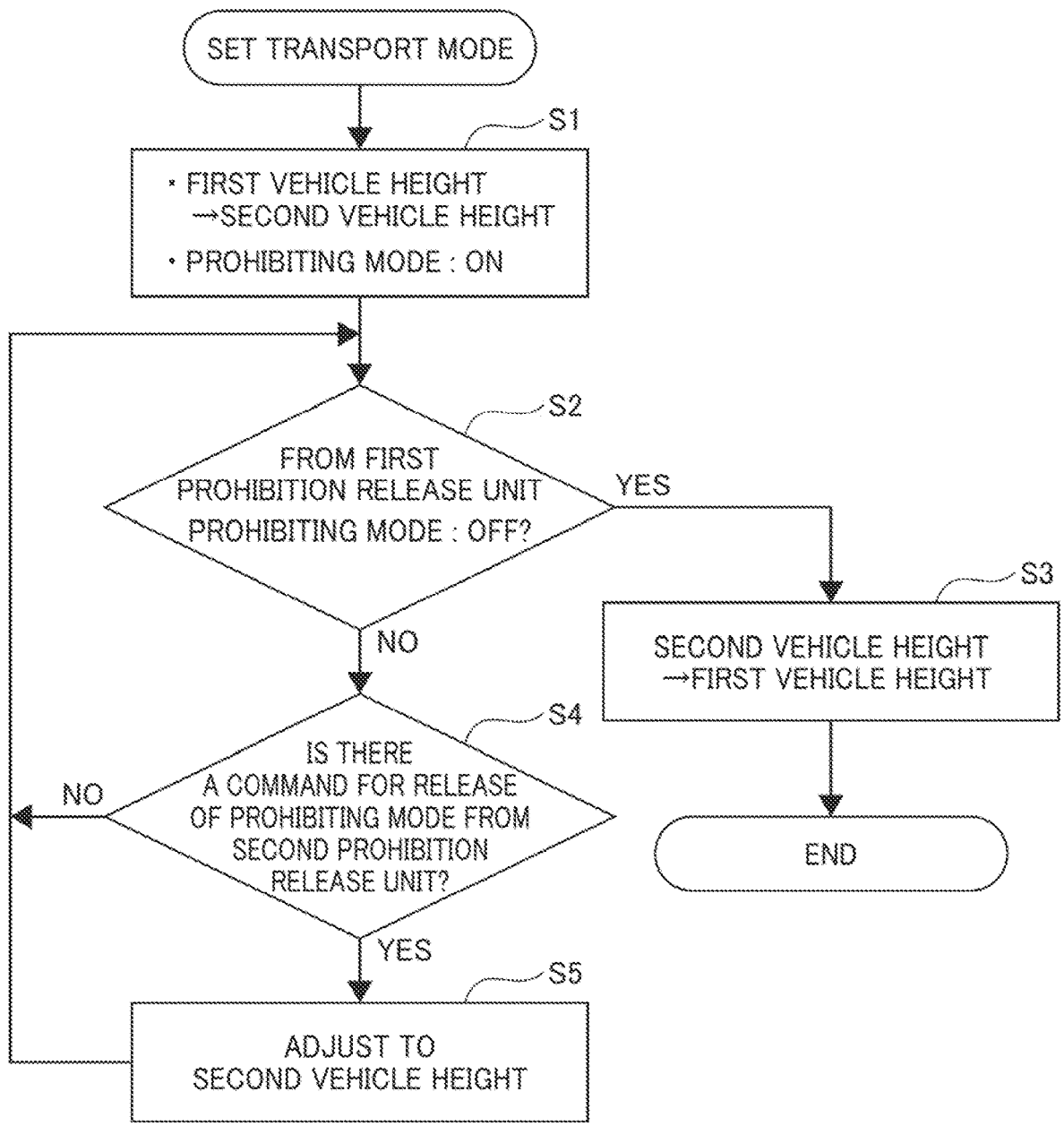

VEHICLE HEIGHT ADJUSTMENT DEVICE

This application is based on and claims the benefit of priority from Chinese Patent Application No. 202110817537.7, filed on 20 Jul. 2021, the content of which is incorporated herein by reference.

BACKGROUND OF THE INVENTION

Field of the Invention

The present invention relates to a vehicle height adjustment device.

Related Art

Conventionally, in a vehicle height adjustment device configured so as to lower the vehicle height when the ignition switch is turned OFF, for example, a device has been known equipped with a prohibiting means which prohibits execution of the vehicle height adjustment when the ignition switch is turned OFF, in the case of being determined that the vehicle is during transport by detection of a transport hook (for example, refer to Patent Document 1). According to this vehicle height adjustment device, even if the ignition switch is turned OFF after transport hooks are installed and lashing of the vehicle is completed, the vehicle height will not decline. For this reason, lashing of the vehicle is prevented from unintentionally loosening during transport.

Patent Document 1: Japanese Unexamined Patent Application, Publication No. 2006-126812

SUMMARY OF THE INVENTION

However, even if the vehicle height were set to a predetermined height by the vehicle height adjustment device, the vehicle height may unintentionally change subsequently due to system factors or environmental factors. For example, in the case of the suspension of a vehicle being an air suspension controlled by air pressure, the vehicle height will change from the predetermined height, if an air leak occurs during transport of the vehicle. In addition, if transport of the vehicle spans a long period of time, the vehicle height may change due to temperature variation in the environment in which the vehicle is placed. If the vehicle height becomes lower than the set height, there is concern over the vehicle contacting the metal fixtures or the like on the floor of the transport means (transport truck or transport ship). If the vehicle height becomes higher than the set height, there is concern over the vehicle contacting the ceiling of the transport means.

With the above-mentioned conventional technology, in order to re-adjust the vehicle height to the original height in the case of the vehicle height unintentionally declining, the prohibiting mode of vehicle height adjustment by the prohibiting means must be temporarily released by unfastening the transport hooks from the vehicle. After vehicle height adjustment, since it is necessary to install the transport hooks to the vehicle again, work for re-adjusting the vehicle height is complex.

The present invention has an object of providing a vehicle height adjustment device allowing for simple re-adjustment of vehicle height, even after vehicle height adjustment is prohibited.

A vehicle height adjustment device (for example, the vehicle height adjustment device 1 described later) according to a first aspect of the present invention includes: a vehicle height adjuster (for example, the vehicle height adjuster 2 described later) which adjusts vehicle height; a prohibiting mode setter (for example, the prohibiting mode setter 3 described later) which sets a prohibiting mode that prohibits vehicle height adjustment by the vehicle height adjuster; a first prohibition release unit (for example, the first prohibition release unit 4 described later) for performing release of the prohibiting mode in the prohibiting mode setter; and a second prohibition release unit (for example, the second prohibition release unit 5 described later) which enables vehicle height adjustment by the vehicle height adjuster, while the prohibiting mode is set by the prohibiting mode setter.

According to a second aspect of the present invention, in the vehicle height adjustment device as described in the first aspect, the vehicle height adjuster may be configured to enable adjustment to at least two types of vehicle heights among a first vehicle height in a case of the prohibiting mode not being set, and a second vehicle height in a case of the prohibiting mode being set, and adjusts the vehicle height to the second vehicle height in a case of the second prohibition release unit activating while the prohibiting mode is set.

According to a third aspect of the present invention, in the vehicle height adjustment device as described in the first or second aspect, the first prohibition release unit may be configured by an interface connecting an external device (for example, the special tool 10 described later) for performing instruction of release of the prohibiting mode, and the second prohibition release unit may be configured so as to activate by an on operation of an ignition switch (for example, the ignition switch 20 described later) of the vehicle, and enable vehicle height adjustment by the vehicle height adjuster.

According to a fourth aspect of the present invention, in the vehicle height adjustment device as described in the third aspect, the vehicle height adjuster may execute vehicle height adjustment during operation of a drive source (for example, the drive source 30 described later) of the vehicle, in a case of the second activated.

According to the first aspect of the present invention, even under a condition of the prohibiting mode in which vehicle height adjustment is prohibited by the prohibiting mode setter during transport of the vehicle or the like, in the case of the vehicle height unintentionally changing, vehicle height adjustment by the vehicle height adjuster is possible by the second prohibition release unit separate from the first prohibition release unit. For this reason, according to this vehicle height adjustment device, even after the vehicle height adjustment is prohibited, simple re-adjustment of vehicle height becomes possible.

According to the second aspect of the present invention, in the case of the second vehicle height set under the condition of the prohibiting mode unintentionally changing, the vehicle height is adjusted so as to return to the second vehicle height according to the activation of the second prohibition release unit. For this reason, in the case of the vehicle height changing due to environmental factors or system factors during transport of the vehicle, it is possible to very easily perform re-adjustment work of the vehicle height without requiring movement of the vehicle, etc.

According to the third aspect of the present invention, even if the prohibiting mode is set, it is possible to simply execute vehicle height adjustment by the vehicle height adjuster by the operator simply turning ON the ignition switch of the vehicle without requiring the use of the external device.

According to the fourth aspect of the present invention, since the vehicle height is adjusted under a condition of the drive source of the vehicle operating, it is possible to simply execute vehicle height adjustment without using an external device. In the case of the drive source of the vehicle being an internal combustion engine, since vehicle height adjustment will not be executed in a non-driving state of the internal combustion engine, it is possible to avoid excessive consumption of the battery equipped to the vehicle.

BRIEF DESCRIPTION OF THE DRAWINGS

FIG. 2 is a flowchart showing the flow of processing of vehicle height adjustment in a transport mode by a vehicle height adjustment device according to an embodiment.

DETAILED DESCRIPTION OF THE INVENTION

Figure 1:
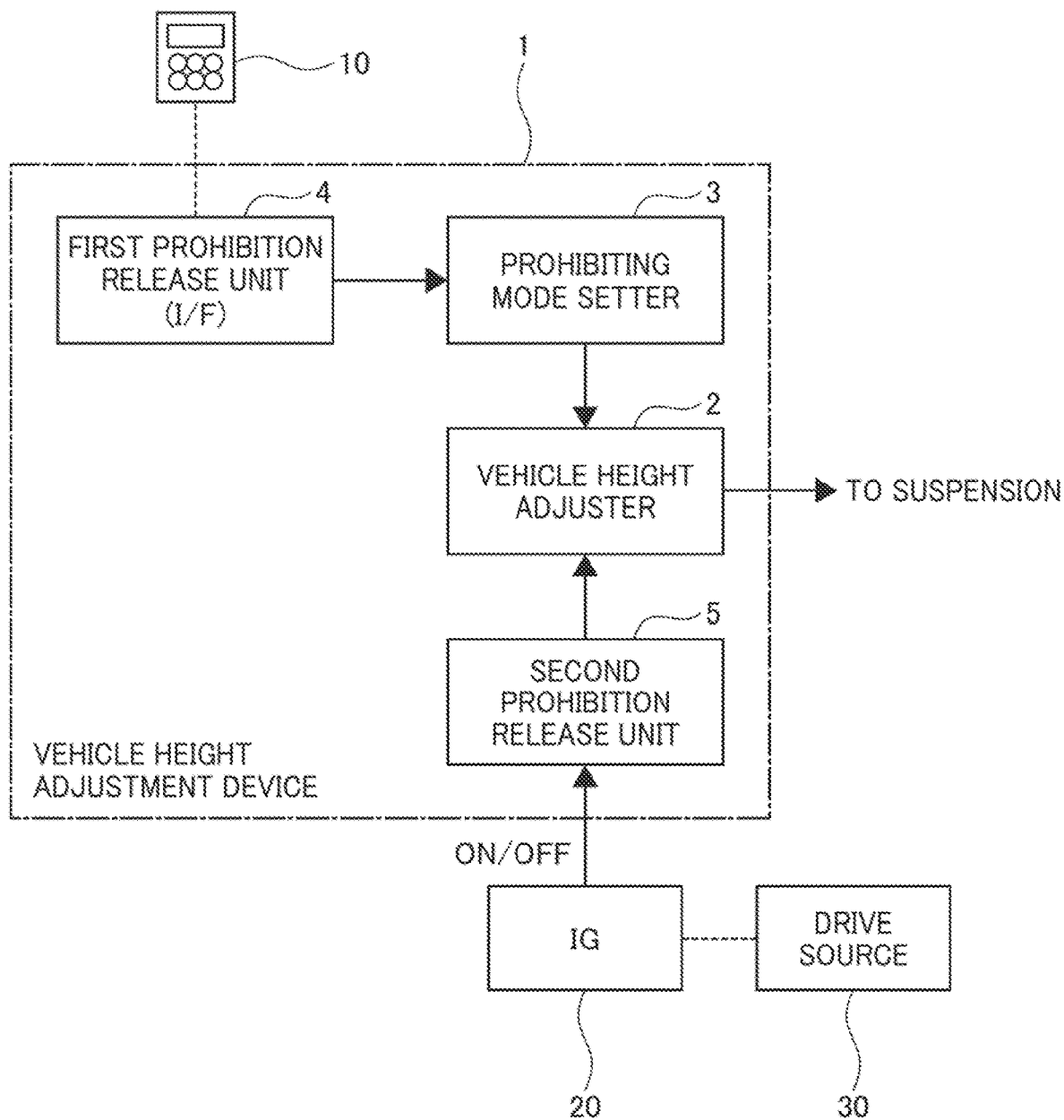
FIG. 1 is a block diagram showing an outline configuration of a vehicle height adjustment device according to an embodiment.

Hereinafter, an embodiment of the present invention will be explained in detail by referencing the drawings. FIG. 1 is a block diagram showing an outline configuration of a vehicle height adjustment device according to an embodiment.

A vehicle height adjustment device 1 is equipped to a vehicle which is not illustrated, and executes vehicle height adjustment by controlling the suspension of a vehicle. In detail, in the case of the suspension being pneumatic type, the vehicle height adjustment device 1 performs vehicle height adjustment by controlling the air volume in the suspension. In the case of the suspension being hydraulic type, the vehicle height adjustment device 1 performs vehicle height adjustment by controlling the oil volume in the suspension. The vehicle height adjustment device 1 may be equipped to a vehicle as a dedicated device performing vehicle height adjustment by controlling the suspension, or may be configured by an electronic control unit (ECU) equipped to the vehicle.

The vehicle height adjustment device 1 includes a vehicle height adjuster 2, prohibiting mode setter 3, first prohibition release unit 4 and second prohibition release unit 5.

The vehicle height adjuster 2 performs vehicle height adjustment by outputting a command (control value of air volume or oil volume) for adjusting the vehicle height to the suspension. The vehicle height adjuster 2 has set values for a plurality of different vehicle heights saved in a storage unit which is not shown. As the plurality of vehicle heights, there is a vehicle height set during a normal mode in which the vehicle performs normal travel (hereinafter referred to as first vehicle height); and a vehicle height set during a transport mode mounting the vehicle to a transport truck or transport ship and transporting (hereinafter referred to as second vehicle height). Otherwise, at least one vehicle height including a height different from the first vehicle height and second vehicle height selectable by the user may be included in the plurality of vehicle heights. The vehicle height adjuster 2 outputs a command for vehicle height adjustment to the suspension, based on the set value of any vehicle height selected among this plurality of vehicle heights, upon vehicle height adjustment.

The prohibiting mode setter 3 sets the prohibiting mode which disables vehicle height adjustment in the vehicle height adjuster 2. While the vehicle height adjuster 2 is being set to the prohibiting mode by the prohibiting mode setter 3, except for a case of performing vehicle height adjustment by a function of the second prohibition release unit 5 described later, the vehicle height adjuster 2 will not output a command for vehicle height adjustment to the suspension.

The prohibiting mode setter 3 outputs a command of setting (ON) or release (OFF) of a prohibiting mode to the vehicle height adjuster 2, based on the instruction of setting and release from an operator inputted via an interface described later (I/F), upon vehicle height adjustment at a vehicle manufacturing plant, dealer, etc.

The first prohibition release unit 4 performs instruction of release of the prohibiting mode to the prohibiting mode setter 3. The first prohibition release unit 4 of the present embodiment is configured by an interface (I/F) connecting a special tool 10. The special tool 10 is a dedicated external device consisting of a computer terminal, etc. operated by an operator. The special tool 10 performs various instructions including setting and release of the prohibiting mode to the vehicle height adjustment device 1. The first prohibition release unit 4, which is an interface (I/F), instructs release of the prohibiting mode to the prohibiting mode setter 3, when there is an input of prohibiting mode release from the special tool 10.

The first prohibition release unit 4 may be configured by a separate interface (I/F) from the interface (I/F) to which the special tool 10 is connected when setting the prohibiting mode. In addition, the first prohibition release unit 4 is not limited to that configured by such an interface (I/F). The first prohibition release unit 4 may be configured by physical switches operable by an operator, for example.

In the present embodiment, the prohibiting mode is set when the vehicle height is adjusted to the second vehicle height during vehicle transport mode by the vehicle height adjuster 2. In other words, in the case of the vehicle height adjuster 2 being set to the prohibiting mode, the vehicle height can be considered to be set to the second vehicle height. In the case of the vehicle height adjuster 2 not being set to the prohibiting mode, the vehicle is set to the first vehicle height or any vehicle height other than the second vehicle height.

The second prohibition release unit 5 enables vehicle height adjustment by the vehicle height adjuster 2, while the vehicle height adjuster 2 is set to the prohibiting mode. In other words, the second prohibition release unit 5 outputs a command for enabling vehicle height adjustment by temporarily releasing the prohibiting mode in the vehicle height adjuster 2, when the vehicle height adjuster 2 is set to the prohibiting mode by the prohibiting mode setter 3.

The second prohibition release unit 5 of the present embodiment is configured so as to activate with the trigger of an ON operation of the ignition switch 20 of the vehicle, as shown in FIG. 1. The ignition switch 20 causes a drive source 30 of the vehicle to operate by being turned ON. In the case of the vehicle including an internal combustion engine which drives by combustion of fuel such as gasoline or diesel, the drive source 30 is an internal combustion engine. In the case of the vehicle including an electric motor driving by electricity, the drive source 30 is an electric motor.

Next, the flow of processing by the vehicle height adjustment device 1 in a vehicle transport mode will be explained by referencing the flowchart shown in FIG. 2. It should be noted that, prior to setting of the transport mode, the vehicle height shall be set to a first vehicle height during the normal mode.

First, in the transport mode, the vehicle height adjuster 2 adjusts the vehicle height from the first vehicle height to the second vehicle height. Herein, the second vehicle height shall be set to higher than the first vehicle height during the normal mode, so that the vehicle does not contact metal fixtures, etc. on the floor. The adjustment to the second vehicle height during the transport mode is performed by an input operation of the special tool 10 or the like connected to the vehicle height adjustment device 1 in the manufacturing plant or the like. Furthermore, by the prohibiting mode setter 3 being set to ON based on an instruction from the special tool 10 or the like, the vehicle height adjuster 2 is set (ON) to the prohibiting mode disabling vehicle height adjustment (Step S1).

During transport of the vehicle adjusted to the second vehicle height, the vehicle state is observed by the operator, and clearance between the vehicle body and metal fixtures on the floor or ceiling is confirmed. When the vehicle arrives at a destination (for example, dealer), work for returning the vehicle height to the first vehicle height during normal mode at the transport destination is performed. At this time, the special tool 10 is newly connected to the interface (I/F) of the vehicle height adjustment device 1, and the prohibiting mode is released by an input operation of the special tool 10 by the operator. For this reason, the vehicle height adjuster 2 determines whether the prohibiting mode has been released by an input operation of the special tool 10 via the interface (I/F) (first prohibition release unit 4), after set to the prohibiting mode (Step S2).

In Step S2, in the case of being determined that the prohibiting mode was released (OFF) (Step S2: YES), the vehicle height adjuster 2 adjusts the vehicle height from the second vehicle height during transport mode to the first vehicle height during normal mode (Step S3). The transport mode thereby ends, and the transport mode setting is released.

On the other hand, in Step S2, in the case of being determined that the prohibiting mode is not released (OFF) (Step S2: NO), the vehicle height adjuster 2 determines the presence/absence of a command from the second prohibition release unit 5 (Step S4).

In detail, if the vehicle height is lower or higher than the second vehicle height due to environmental factors or system factors during transport of the vehicle, the clearance between the vehicle body and metal fixtures on the floor and the ceiling will change. If confirming that the clearance changed, the operator turns ON the ignition switch 20 of the vehicle in order to return the vehicle height to the second vehicle height. When the ignition switch 20 is turned ON, the second prohibition release unit 5 activates. A command for enabling vehicle height adjustment by temporarily releasing the prohibiting mode is thereby outputted to the vehicle height adjuster 2 from the second prohibition release unit 5. In other words, the vehicle height adjuster 2 determines whether the vehicle height changed from the second vehicle height during transport, i.e. whether there is an instruction from the operator for returning to the second vehicle height, by determining the presence/absence of a command of temporary release of the prohibiting mode from the second prohibition release unit 5 while set to the prohibiting mode.

In the case of there not being a command for temporary release of the prohibiting mode from the second prohibition release unit 5 (Step S4: NO), the processing returns to Step S2.

In the case of there being a command for temporary release of prohibiting mode from the second prohibition release unit 5 by the ignition switch 20 being turned ON (Step S4: YES), the vehicle height adjuster 2 adjusts the vehicle height in the direction approaching the second vehicle height, and returns the vehicle height to the second vehicle height (Step S5).

In detail, when the ignition switch 20 is turned ON, the drive source 30 of the vehicle operates. The vehicle height adjuster 2 executes operation to return the vehicle height to the second vehicle height, during operation of the drive source 30 of the vehicle. In the case of the drive source 30 being an internal combustion engine, during operation of the drive source 30 is a state in which the internal combustion engine is running (state generating rotational motion). In this state, since the power generation is performed by rotation of a generator connected to the internal combustion engine, it is possible to reduce the load which electrical consumption for vehicle height adjustment puts on a 12 V battery equipped to the vehicle. In the case of the drive source 30 being an electric motor, during operation of the drive source 30 is a Ready state of the vehicle (active state of the battery for operating the electric motor).

After the vehicle height returns to the second vehicle height in Step S5, the vehicle height adjuster 2 is set (ON) to the prohibiting mode again. Subsequently, until arriving at the transport destination, i.e. until determined that the prohibiting mode was released in Step S2, the processing from Step S2 is repeated.

In the above way, the vehicle height adjustment device 1 according to the present embodiment exerts the following effects. More specifically, the vehicle height adjustment device 1 according to the present embodiment includes: the vehicle height adjuster 2 which adjusts vehicle height; the prohibiting mode setter 3 which sets the prohibiting mode that prohibits the vehicle height adjustment by the vehicle height adjuster 2; the first prohibition release unit 4 for performing release of the prohibiting mode in the prohibiting mode setter 3; and the second prohibition release unit 5 which enables vehicle height adjustment by the vehicle height adjuster 2, while the prohibiting mode is set by the prohibiting mode setter 3. According to this, even under a condition of the prohibiting mode in which vehicle height adjustment is prohibited by the prohibiting mode setter 3 during transport of the vehicle or the like, in the case of the vehicle height unintentionally changing, vehicle height adjustment by the vehicle height adjuster 2 is possible by the second prohibition release unit 5 separate from the first prohibition release unit 4. For this reason, even after the vehicle height adjustment is prohibited, simple re-adjustment of vehicle height becomes possible.

The vehicle height adjuster 2 of the present embodiment is configured to be adjustable to at least two types of vehicle heights among the first vehicle height (vehicle height during normal mode) in the case of the prohibiting mode not being set, and the second vehicle height (vehicle height during transport mode) in the case of the prohibiting mode being set, and is configured so as to adjust the vehicle height to the second vehicle height in the case of the second prohibition release unit 5 activating while the prohibiting mode is set. According to this, in the case of the second vehicle height set under the condition of the prohibiting mode unintentionally changing, since the vehicle height is adjusted so as to return to the second vehicle height according to the activation of the second prohibition release unit 5, in the case of the vehicle height changing due to environmental factors or system factors during transport of the vehicle, it is possible to very easily perform re-adjustment work of the vehicle height without requiring movement of the vehicle, etc.

The first prohibition release unit 4 of the present embodiment is configured by an interface connecting the special tool 10, which is an external device for performing instruction of release of the prohibiting mode, and the second prohibition release unit 5 is configured so as to activate by an ON operation of the ignition switch 20 of the vehicle, and enable vehicle height adjustment by the vehicle height adjuster 2. According to this, even if the prohibiting mode is set, it is possible to simply execute vehicle height adjustment by the vehicle height adjuster 2 by the operator simply turning ON the ignition switch 20 of the vehicle without requiring the use of the special tool 10.

The vehicle height adjuster 2 of the present embodiment executes vehicle height adjustment during operation of the drive source 30 of the vehicle, in the case of the second prohibition release unit 5 activating. According to this, since the vehicle height is adjusted under a condition of the drive source 30 of the vehicle operating, it is possible to simply execute vehicle height adjustment without using an external device such as the special tool 10. In the case of the drive source 30 of the vehicle being an internal combustion engine, since vehicle height adjustment will not be executed in a non-driving state of the internal combustion engine, it is possible to avoid excessive consumption of the battery equipped to the vehicle.

EXPLANATION OF REFERENCE NUMERALS

1 vehicle height adjustment device
2 vehicle height adjuster
3 prohibiting mode setter
4 first prohibition release unit (interface)
5 second prohibition release unit
10 special tool (external device)
20 ignition switch
30 drive source

What is claimed is:

1. A vehicle height adjustment device comprising:
a vehicle height adjuster which adjusts vehicle height;
a prohibiting mode setter which sets a prohibiting mode that prohibits vehicle height adjustment by the vehicle height adjuster;
a first prohibition release unit for performing release of the prohibiting mode in the prohibiting mode setter; and
a second prohibition release unit which enables vehicle height adjustment by the vehicle height adjuster, while the prohibiting mode is set by the prohibiting mode setter,
wherein the vehicle height adjuster is configured to enable adjustment to at least two types of vehicle heights among a first vehicle height in a case of the prohibiting mode not being set, and a second vehicle height in a case of the prohibiting mode being set, and adjusts the vehicle height to the second vehicle height in a case of the second prohibition release unit activating while the prohibiting mode is set.

2. A vehicle height adjustment device comprising:
a vehicle height adjuster which adjusts vehicle height;
a prohibiting mode setter which sets a prohibiting mode that prohibits vehicle height adjustment by the vehicle height adjuster;
a first prohibition release unit for performing release of the prohibiting mode in the prohibiting mode setter; and
a second prohibition release unit which enables vehicle height adjustment by the vehicle height adjuster, while the prohibiting mode is set by the prohibiting mode setter,
wherein the first prohibition release unit is configured by an interface connecting an external device for performing instruction of release of the prohibiting mode, and
wherein the second prohibition release unit is configured so as to activate by an operation of an ignition switch of a vehicle, and enable vehicle height adjustment by the vehicle height adjuster.

3. The vehicle height adjustment device according to claim 2, wherein the vehicle height adjuster executes vehicle height adjustment during operation of a drive source of the vehicle, in a case of the second prohibition release unit having activated.

* * * * *